United States Patent

Hamaya

(10) Patent No.: US 10,852,160 B2
(45) Date of Patent: Dec. 1, 2020

(54) SIGNAL MEASURING DEVICE

(71) Applicant: Mitsubishi Electric Corporation, Tokyo (JP)

(72) Inventor: Yoichiro Hamaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 534 days.

(21) Appl. No.: 15/525,199

(22) PCT Filed: Dec. 1, 2014

(86) PCT No.: PCT/JP2014/081768
§ 371 (c)(1),
(2) Date: May 8, 2017

(87) PCT Pub. No.: WO2016/088181
PCT Pub. Date: Jun. 9, 2016

(65) Prior Publication Data
US 2018/0283899 A1 Oct. 4, 2018

(51) Int. Cl.
*G01D 5/14* (2006.01)
*G01D 21/00* (2006.01)

(52) U.S. Cl.
CPC .............. *G01D 5/14* (2013.01); *G01D 21/00* (2013.01)

(58) Field of Classification Search
CPC ........................................................ G01D 5/14
See application file for complete search history.

(56) References Cited

U.S. PATENT DOCUMENTS 3,229,276 A * 1/1966 Harple .................... H03M 1/00
340/870.07
4,086,805 A 5/1978 Kinderling et al.
(Continued)

FOREIGN PATENT DOCUMENTS

JP 54-66188 A 5/1979
JP 55082005 A * 6/1980
(Continued)

OTHER PUBLICATIONS

Office Action dated Jan. 25, 2019, by the Chinese Patent Office in corresponding Chinese Patent Application No. 201480083634.6 and English translation of the Office Action. (15 pages).
(Continued)

*Primary Examiner* — Walter L Lindsay, Jr.
*Assistant Examiner* — Milton Gonzalez
(74) *Attorney, Agent, or Firm* — Buchanan Ingersoll & Rooney PC

(57) ABSTRACT

This signal measuring device includes: one input circuit for receiving a process signal from each of first through Mth detection units; a signal switching unit for performing open/close switching between each detection unit and the input circuit; a signal processing unit connected to the input circuit and for processing the process signal; and a switching command unit for outputting, to the signal switching unit, a switching command signal that corresponds to an open/close time set such that one of the plurality of the detection units is connected to the input circuit, the switching command unit outputting, to the signal processing unit, a measurement command signal that corresponds to a stable measurement time which is set for each of the plurality of the detection units and after which the process signal inputted from each of the plurality of the detection units to the input circuit is stably measurable.

6 Claims, 6 Drawing Sheets

(56) References Cited

U.S. PATENT DOCUMENTS

| | | | | |
|---|---|---|---|---|
| 5,968,100 | A | * 10/1999 | Kayano | ............... B60R 16/0315 |
| | | | | 701/1 |
| 2003/0215244 | A1 | * 11/2003 | Norizuki | ............... H04L 12/437 |
| | | | | 398/175 |
| 2011/0140714 | A1 | * 6/2011 | Hernando | ............ G01R 27/025 |
| | | | | 324/551 |

FOREIGN PATENT DOCUMENTS

| | | |
|---|---|---|
| JP | 57-25100 A | 2/1982 |
| JP | 59-212997 A | 12/1984 |
| JP | 63-41722 U | 3/1988 |
| JP | 63-109327 A | 5/1988 |
| JP | 1-316802 A | 12/1989 |
| JP | 2007-156847 A | 6/2007 |

OTHER PUBLICATIONS

Office Action dated Oct. 29, 2018, by the Chinese Patent Office in corresponding Chinese Patent Application No. 201480083634.6 and English translation of the Office Action. (15 pages).

Office Action (Notification of Reasons for Refusal) dated Sep. 5, 2017, by the Japanese Patent Office in corresponding Japanese Patent Application No. 2016-562109, and an English Translation of the Office Action. (6 pages).

Extended European Search Report dated Mar. 26, 2018, issued by the European Patent Office in corresponding European Application No. 14907313.2. (7 pages).

International Search Report (PCT/ISA/210) dated Jan. 27, 2015, by the Japanese Patent Office as the International Searching Authority for International Application No. PCT/JP2014/081768.

Written Opinion (PCT/ISA/237) dated Jan. 27, 2015, by the Japanese Patent Office as the International Searching Authority for International Application No. PCT/JP2014/081768.

* cited by examiner

… (1)

SIGNAL MEASURING DEVICE

TECHNICAL FIELD

The present invention relates to a signal measuring device that can stably measure a plurality of continuously varying process signals in a plant such as a nuclear power plant, and that allows downsizing of the device.

BACKGROUND ART

In conventional signal measuring devices, one input circuit unit is necessary for one process signal. With such a configuration of the signal measuring device, the signal measuring device is increased in size in proportion to the number of process signals in a plant as a signal measurement target section.

As a countermeasure against this, the signal measuring device is provided with a scanning switch which sequentially switches and scans a plurality of signal transmission circuits. Accordingly, the signal measuring device handles a plurality of signals by means of one input circuit unit (for example, see Patent Document 1).

CITATION LIST

Patent Document

Patent Document 1: Japanese Laid-Open Patent Publication No. 2007-156847

SUMMARY OF THE INVENTION

Problems to be Solved by the Invention

In the conventional signal measuring device, the signal to be scanned at the contact is limited to an ON signal or an OFF signal. Therefore, for example, there is a problem that the conventional signal measuring device cannot be used for a continuously varying process signal (for example, a signal detected from a resistance temperature sensor, a thermocouple, a transmitter, or the like) which is detected at a plant or the like.

The present invention has been made in order to solve the above problem. An object of the present invention is to provide a signal measuring device that can stably measure a plurality of continuously varying process signals and that allows downsizing of the device.

Solution to the Problems

A signal measuring device according to the present invention is the signal measuring device measuring process signals in a signal measurement target section, the signal measurement target section including a plurality of detection units, each detection unit detecting a continuously varying process signal, the signal measuring device including:
  one input circuit unit for receiving the process signal from each detection unit;
  a signal switching unit for performing open/close switching between each detection unit and the input circuit unit;
  a signal processing unit connected to the input circuit unit and for processing the process signal; and
  a switching command unit for outputting, to the signal switching unit, a switching command signal that corresponds to an open/close time set such that one of the detection units is connected to the input circuit unit, the switching command unit for outputting, to the signal processing unit, a measurement command signal that corresponds to a stable measurement time which is set for each detection unit and after which the process signal inputted from the detection unit to the input circuit unit is stably measurable.

Effect of the Invention

According to the signal measuring device of the present invention, a plurality of continuously varying process signals can be stably measured, and the device can be downsized.

DESCRIPTION OF EMBODIMENTS

Embodiment 1

Hereinafter, an embodiment of the present invention will be described.

Figure 1:
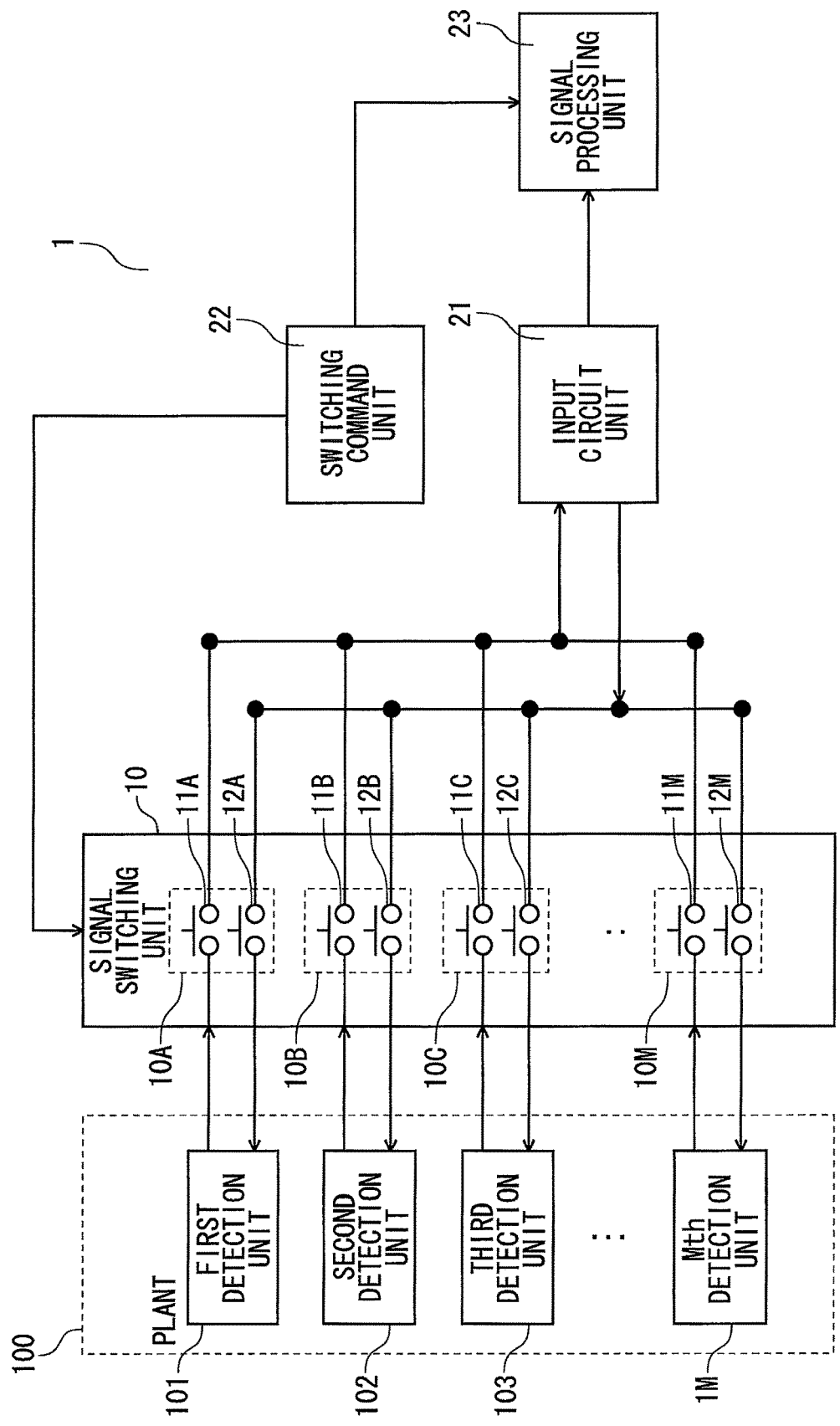
FIG. 1 shows a configuration of a signal measuring device according to embodiment 1 of the present invention.

FIG. 1 shows a configuration of a signal measuring device according to embodiment 1 of the present invention.

Figure 2:
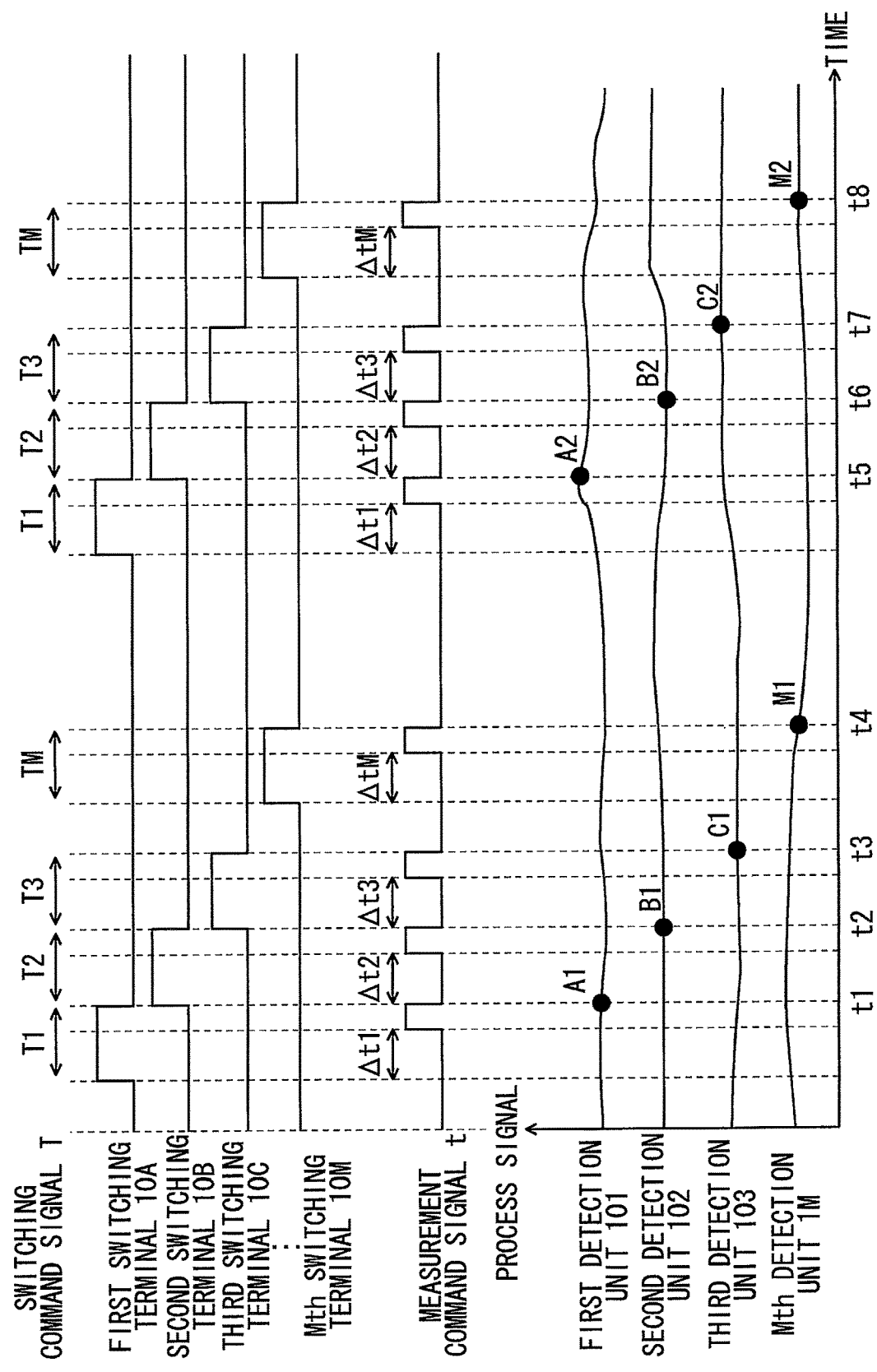
FIG. 2 is a diagram for explaining a signal measuring method performed by the signal measuring device shown in FIG. 1.

FIG. 2 is a diagram for explaining a signal measuring method performed by the signal measuring device shown in FIG. 1.

FIG. 1 is now explained.

A signal measuring device 1 is for measuring continuously varying process signals of a plant 100 as a signal measurement target section.

The continuously varying process signal here does not mean a binary signal that takes values such as a low level value and a high level value, but means a signal that can take a value other than two values.

As the plant 100, a nuclear power plant or the like is conceivable, for example.

In the plant 100, a plurality of process signals are present.

In the plant 100, a plurality of detection units which detect these plurality of process signals are present.

As the detection units in the present embodiment 1, a plurality of detections units which are a first detection unit 101, a second detection unit 102, a third detection unit 103, and an Mth detection unit 1M are present.

In the present embodiment 1, an example in which four detection units are formed is shown. However, not limited thereto, as long as two or more detection units are present, a similar effect can be attained.

Since this also applies to the embodiments below, this explanation is omitted as appropriate.

The signal measuring device 1 includes a signal switching unit 10, an input circuit unit 21, a signal processing unit 23, and a switching command unit 22.

The input circuit unit 21 receives a process signal from each of the first detection unit 101, the second detection unit 102, the third detection unit 103, and the Mth detection unit 1M.

The input circuit unit 21 is composed of one circuit unit, and can receive a process signal only from one detection unit among the plurality of the detection units.

The signal switching unit 10 performs open/close switching between the first detection unit 101, the second detection unit 102, the third detection unit 103, and the Mth detection unit 1M, and the input circuit unit 21.

The signal switching unit 10 includes a first switching terminal portion 10A which connects the first detection unit 101 and the input circuit unit 21.

The signal switching unit 10 includes a second switching terminal portion 10B which connects the second detection unit 102 and the input circuit unit 21.

The signal switching unit 10 includes a third switching terminal portion 10C which connects the third detection unit 103 and the input circuit unit 21.

The signal switching unit 10 includes an Mth switching terminal portion 10M which connects the Mth detection unit 1M and the input circuit unit 21.

In the present embodiment 1, a case will be described in which the first detection unit 101, the second detection unit 102, the third detection unit 103, and the Mth detection unit 1M are each composed of a thermocouple.

Such a detection unit composed of a thermocouple detects a process signal that utilizes a phenomenon in which a thermoelectromotive force occurs.

In this case, the signal switching unit 10 has a first input terminal 11A and a first output terminal 12A as the first switching terminal portion 10A for the first detection unit 101.

The signal switching unit 10 also has a first input terminal 11B and a first output terminal 12B as the second switching terminal portion 10B for the second detection unit 102.

The signal switching unit 10 also has a first input terminal 11C and a first output terminal 12C as the third switching terminal portion 10C for the third detection unit 103.

The signal switching unit 10 also has a first input terminal 11M and a first output terminal 12M as the Mth switching terminal portion 10M for the Mth detection unit 1M.

The first detection unit 101 and the input circuit unit 21 are connected via the first input terminal 11A and the first output terminal 12A.

The second detection unit 102 and the input circuit unit 21 are connected via the first input terminal 11B and the first output terminal 12B.

The third detection unit 103 and the input circuit unit 21 are connected via the first input terminal 11C and the first output terminal 12C.

The Mth detection unit 1M and the input circuit unit 21 are connected via the first input terminal 11M and the first output terminal 12M.

The first input terminals 11A, 11B, 11C, 11M and the first output terminals 12A, 12B, 12C, 12M are each composed of a switching mechanism which performs opening/closing.

The signal processing unit 23 is connected to the input circuit unit 21 and processes the process signals.

The switching command unit 22 outputs to the signal switching unit 10 a switching command signal T that corresponds to the open/close time.

Specifically, to each of the first switching terminal portion 10A, the second switching terminal portion 10B, the third switching terminal portion 10C, and the Mth switching terminal portion 10M of the signal switching unit 10, a switching command signal T that corresponds to the open/close time thereof is transmitted from the switching command unit 22.

That is, switching command signals T1, T2, T3, TM are respectively inputted to the first input terminals 11A, 11B, 11C, 11M, and the first output terminals 12A, 12B, 12C, 12M.

Each open/close time according to the switching command signal T1, T2, T3, TM is set such that one of the first detection unit 101, the second detection unit 102, the third detection unit 103, and the Mth detection unit 1M is connected to the input circuit unit 21.

Each open/close time is set as appropriate in accordance with the interval at which its corresponding one of the first detection unit 101, the second detection unit 102, the third detection unit 103, and the Mth detection unit 1M needs to measure the process signal.

Further, the switching command unit 22 outputs, to the signal processing unit 23, a measurement command signal t in accordance with a stable measurement time Δt which is set for each of the first detection unit 101, the second detection unit 102, the third detection unit 103, and the Mth detection unit 1M.

Each stable measurement time Δt is determined in advance on the basis of the circuit extending from its corresponding one of the first detection unit 101, the second detection unit 102, the third detection unit 103, and the Mth detection unit 1M, via the signal switching unit 10, to the input circuit unit 21.

The stable measurement time Δt is a time period from when its corresponding circuit has entered a closed state to when the process signal inputted to the input circuit unit 21 becomes able to be stably measured.

This time period is set because, immediately after the circuit has entered a closed state, the process signal cannot be accurately measured due to occurrence of noise, an unstable state of the circuit, and the like.

Therefore, if the process signal is measured after the stable measurement time Δt has elapsed after the circuit had entered a closed state, accurate measurement can be performed.

The stable measurement time Δt is a time period specific to each circuit. In the case of the first detection unit 101, a stable measurement time Δt1 is determined that is specific to the circuit extending from the first detection unit 101, through the first input terminal 11A, the input circuit unit 21, and the first output terminal 12A, to the first detection unit 101.

In the case of the second detection unit 102, a stable measurement time Δt2 is determined that is specific to the circuit extending from the second detection unit 102, through the first input terminal 11B, the input circuit unit 21, and the first output terminal 12B, to the second detection unit 102.

In the case of the third detection unit 103, a stable measurement time Δt3 is determined that is specific to the circuit extending from the third detection unit 103, through the first input terminal 11C, the input circuit unit 21, and the first output terminal 12C, to the third detection unit 103. In the case of the Mth detection unit 1M, a stable measurement time ΔtM is determined that is specific to the circuit extending from the Mth detection unit 1M, through the first input terminal 11M, the input circuit unit 21, and the first output terminal 12M, to the Mth detection unit 1M.

Next, a signal measuring method performed by the signal measuring device 1 according to embodiment 1 configured as above will be described with reference to FIG. 2.

FIG. 2 shows a chart of timings at which the switching command unit 22 transmits the switching command signal T to the signal switching unit 10 and the switching command unit 22 transmits the measurement command signal t to the signal processing unit 23. Further, FIG. 2 shows the stable measurement time Δt for transmitting the measurement command signal t.

FIG. 2 also shows temporal change of the measurement value of the process signal measured on the basis of the measurement command signal t for the process signal of each of the first detection unit 101, the second detection unit 102, the third detection unit 103, and the Mth detection unit 1M.

With respect to the switching command signal T shown in FIG. 2, the high level state indicates "closed", and the low level state indicates "open". That is, when the switching command signal T is in the high level state, it means that measuring is being performed, and when the switching command signal T is in the low level state, it means that measuring is not being performed.

The switching command signal T1 is transmitted to the first switching terminal portion 10A.

The switching command signal T2 is transmitted to the second switching terminal portion 10B.

The switching command signal T3 is transmitted to the third switching terminal portion 10C.

The switching command signal TM is transmitted to the Mth switching terminal portion 10M.

As shown in FIG. 2, the open/closed states of the first switching terminal portion 10A, the second switching terminal portion 10B, the third switching terminal portion 10C, and the Mth switching terminal portion 10M are sequentially switched in accordance with the switching command signal T.

Thus, only one among the first switching terminal portion 10A, the second switching terminal portion 10B, the third switching terminal portion 10C, and the Mth switching terminal portion 10M is in a closed state during a certain time.

The time periods during which the first switching terminal portion 10A, the second switching terminal portion 10B, the third switching terminal portion 10C, and the Mth switching terminal portion 10M are respectively in a closed state, i.e., the time in which the switching command signal T is in a high level state, can be set by the switching command unit 22 for the first detection unit 101, the second detection unit 102, the third detection unit 103, and the Mth detection unit 1M, respectively.

Then, one of the first detection unit 101, the second detection unit 102, the third detection unit 103, and the Mth detection unit 1M is to be connected to the input circuit unit 21.

Next, the measurement command signal t is transmitted to the signal processing unit 23 so that the process signal after a lapse of the stable measurement time Δt1, Δt2, Δt3, ΔtM from the start point of the switching command signal T1, T2, T3, TM is measured.

Thus, in the first detection unit 101, on the basis of the measurement command signal t transmitted to the signal processing unit 23 after a lapse of the stable measurement time Δt1 from the start point of the switching command signal T1, a process signal A1 is measured at time t1, and a process signal A2 is measured at time t5, and accordingly, continuous process signal measurement can be performed.

Similarly, in the second detection unit 102, on the basis of the measurement command signal t transmitted to the signal processing unit 23 after a lapse of the stable measurement time Δt2 from the start point of the switching command signal T2, a process signal B1 is measured at time t2, and a process signal B2 is measured at time t6, and accordingly, continuous process signal measurement can be performed.

Similarly, in the third detection unit 103, on the basis of the measurement command signal t transmitted to the signal processing unit 23 after a lapse of the stable measurement time Δt3 from the start point of the switching command signal T3, a process signal C1 is measured at time t3, and a process signal C2 is measured at time t7, and accordingly, continuous process signal measurement can be performed.

Similarly, in the Mth detection unit 1M, on the basis of the measurement command signal t transmitted to the signal processing unit 23 after a lapse of the stable measurement time ΔtM from the start point of the switching command signal TM, the value of a process signal M1 is measured at time t4, and the value of a process signal M2 is measured at t8, and accordingly, continuous process signal measurement can be performed.

According to the signal measuring device of embodiment 1 configured as above, for a plurality of detection units which detect a plurality of process signals in a signal measurement target section, measurement can be performed by one input circuit unit, and thus, the signal measuring device can be downsized. Accordingly, the equipment cost for the signal measuring device can be reduced, and energy saving can be achieved.

Since the process signals are measured on the basis of the measurement command signals which are in accordance with the stable measurement times, respectively, accurate measurement can be performed.

When a process signal is generated by electromotive force in such a case where the detection unit is a thermocouple, if the detection unit and the input circuit unit are connected via the first input terminal and the first output terminal, the process signal of the detection unit can be easily measured.

Embodiment 2

Figure 3:
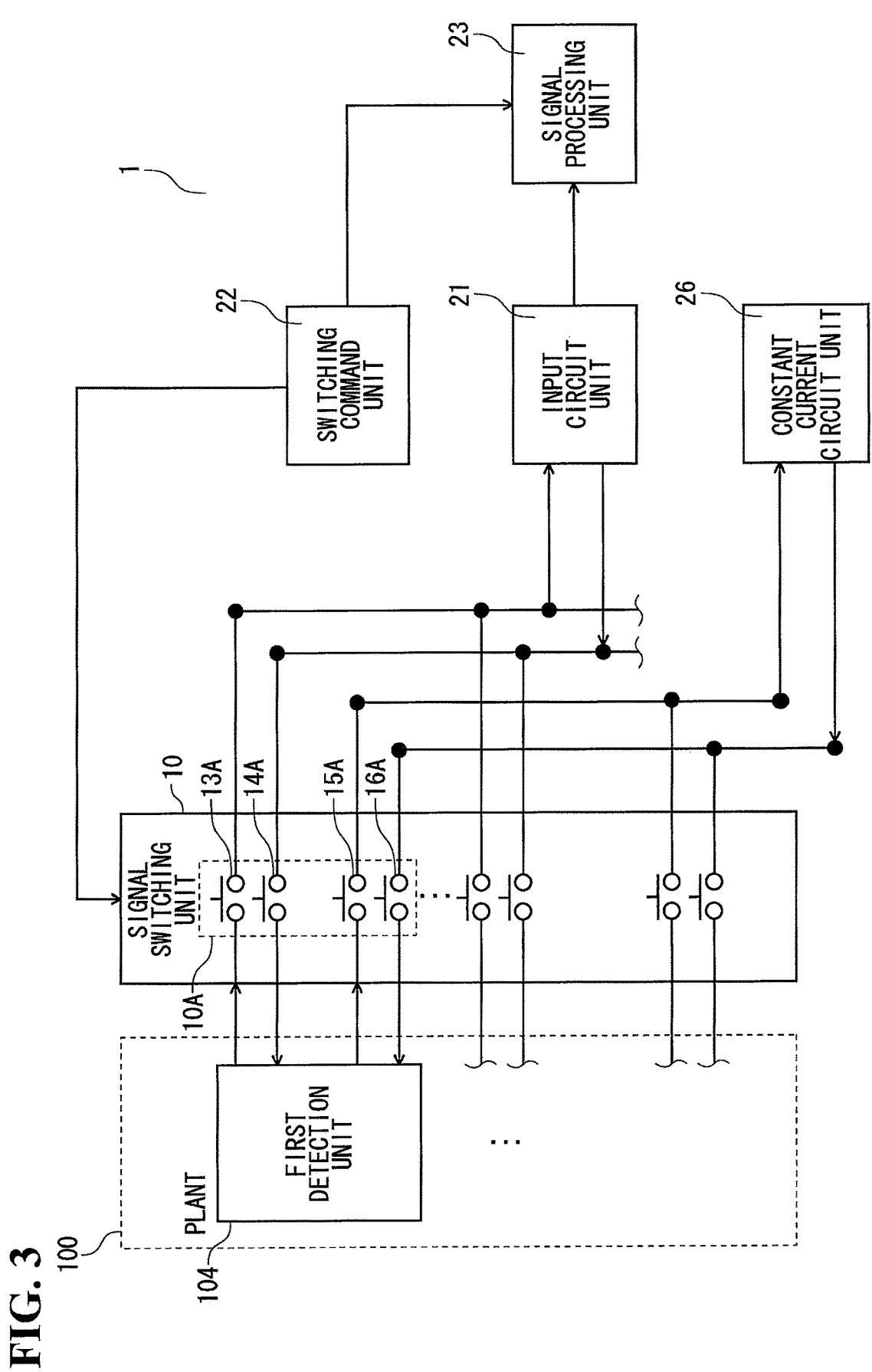
FIG. 3 shows a configuration of a signal measuring device according to embodiment 2 of the present invention.

FIG. 3 shows a configuration of a signal measuring device according to embodiment 2 of the present invention.

Figure 4:
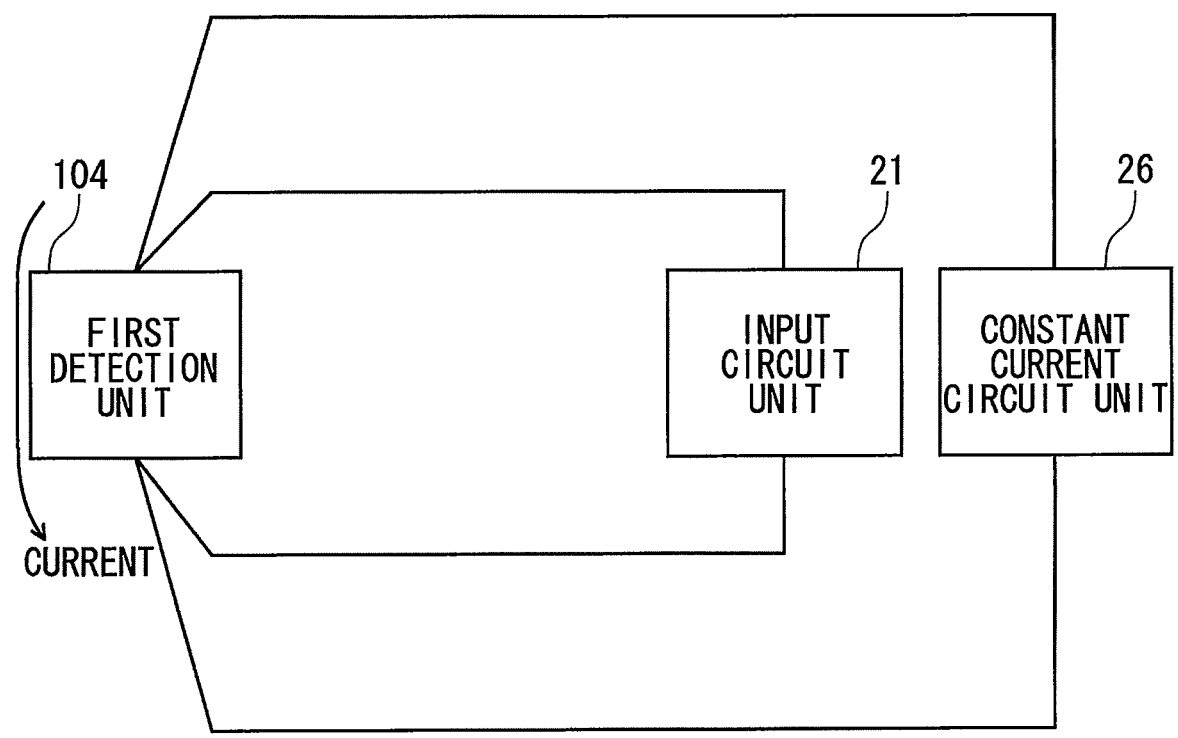
FIG. 4 is a circuit diagram for explaining the relationship between the detection unit and the input circuit unit shown in FIG. 3.

FIG. 4 is a circuit diagram for explaining the relationship among the detection unit, the input circuit unit, and a constant current circuit unit shown in FIG. 3. The difference between the present embodiment 2 and embodiment 1 above is that the detection unit needs a constant current.

As the detection unit that needs a constant current, a resistance temperature sensor is conceivable, for example. The signal measuring method by the signal measuring device according to the present embodiment 2 can be performed in a manner similar to that described with reference to FIG. 2 of embodiment 1 above. Thus, the description of the signal measuring method according to the present embodiment 2 is omitted as appropriate.

In the drawings, parts similar to those in embodiment 1 above are denoted by the same reference characters and description thereof is omitted.

The signal measuring device 1 includes a constant current circuit unit 26 which generates a constant current.

A first detection unit 104 is composed of, for example, a resistance temperature sensor that needs a constant current.

The first switching terminal portion 10A, of the signal switching unit 10, which performs signal switching for the first detection unit 104 includes a second input terminal 13A, a second output terminal 14A, a third input terminal 15A, and a third output terminal 16A.

The second input terminal 13A, the second output terminal 14A, the third input terminal 15A, and the third output terminal 16A are each composed of a switching mechanism which performs opening/closing.

The first detection unit 104 and the input circuit unit 21 are connected via the second input terminal 13A and the second output terminal 14A.

The first detection unit 104 and the constant current circuit unit 26 are connected via the third input terminal 15A and the third output terminal 16A.

The switching command unit 22 outputs switching command signals to the second input terminal 13A, the second output terminal 14A, the third input terminal 15A, and the third output terminal 16A, which are the first switching terminal portion 10A.

In FIG. 3, for convenience, only the first detection unit 104 is shown as the detection unit that needs a constant current, but a plurality of similar detection units are present.

Next, operation of the signal measuring device 1 according to embodiment 2 configured as above will be described. As shown in the circuit diagram in FIG. 4, the constant current circuit unit 26 and the input circuit unit 21 are connected to the first detection unit 104 in parallel. It should be noted that the second input terminal 13A, the second output terminal 14A, the third input terminal 15A, and the third output terminal 16A are present in this circuit, but are not shown in FIG. 4. In the present embodiment 2, the stable measurement time after which the process signal inputted from the first detection unit 104 to the input circuit unit 21 is stably measurable is determined in advance on the basis of this circuit.

Then, the switching for the first detection unit 104 is performed in response to the switching command signal T being transmitted to the second input terminal 13A, the second output terminal 14A, the third input terminal 15A, and the third output terminal 16A. When the signal of the first detection unit 104 is to be measured, the second input terminal 13A, the second output terminal 14A, the third input terminal 15A, and the third output terminal 16A are each in a closed state. Then, the first detection unit 104 is supplied with a constant current from the constant current circuit unit 26. Accordingly, the signal of the first detection unit 104 can be measured as in the embodiment 1 above.

According to the signal measuring device of embodiment 2 configured as above, it is needless to say that effects similar to those obtained by embodiment 1 above are obtained, and with respect to the detection unit that needs a constant current, the constant current circuit unit is connected to the detection unit when the signal of the detection unit is measured. Thus, since the detection unit is supplied with a constant current, the process signal of the detection unit can be easily measured as in embodiment 1 above.

Embodiment 3

Figure 5:
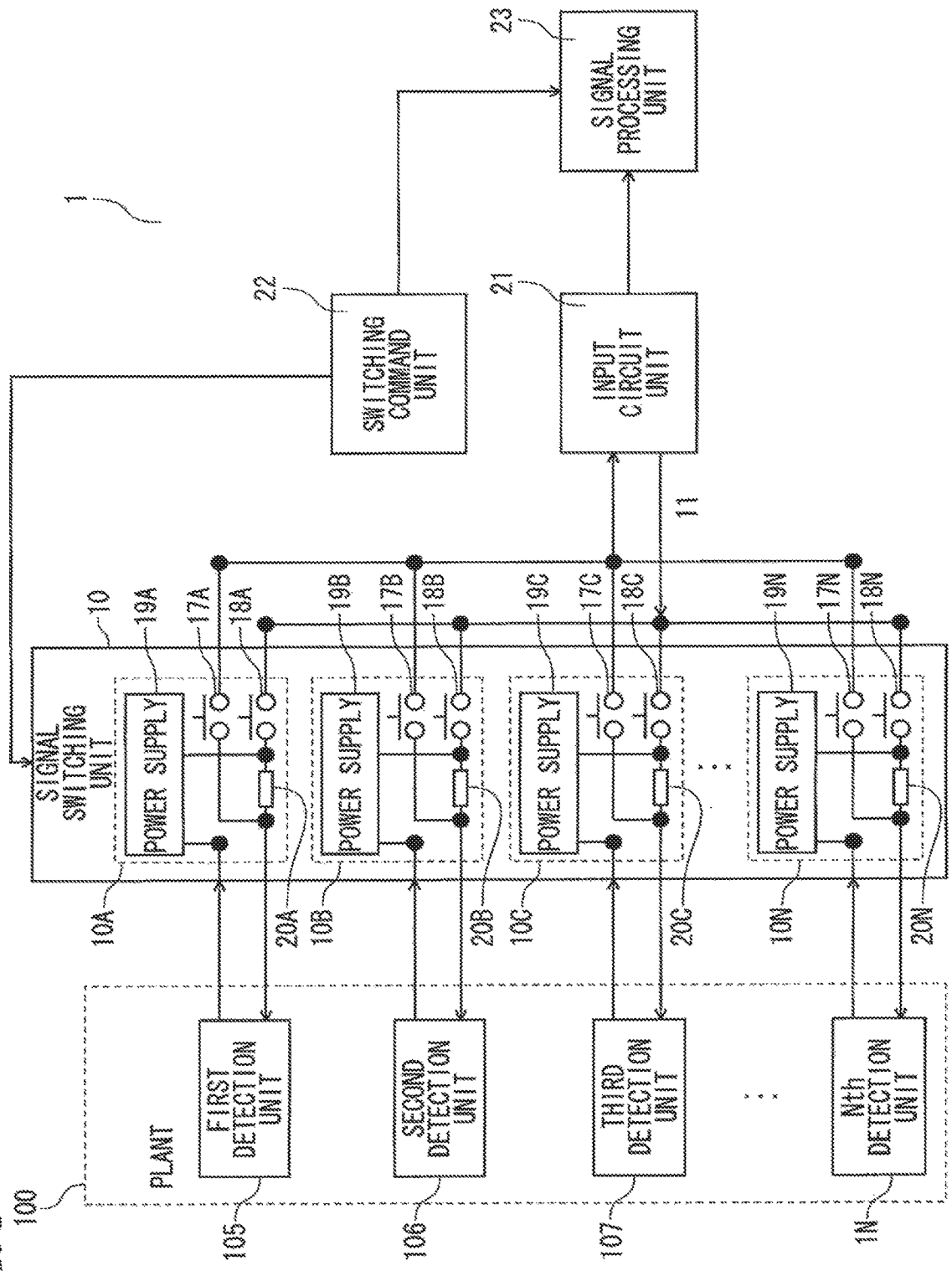
FIG. 5 shows a configuration of a signal measuring device according to embodiment 3 of the present invention.

FIG. 5 shows a configuration of a signal measuring device according to embodiment 3 of the present invention.

Figure 6:
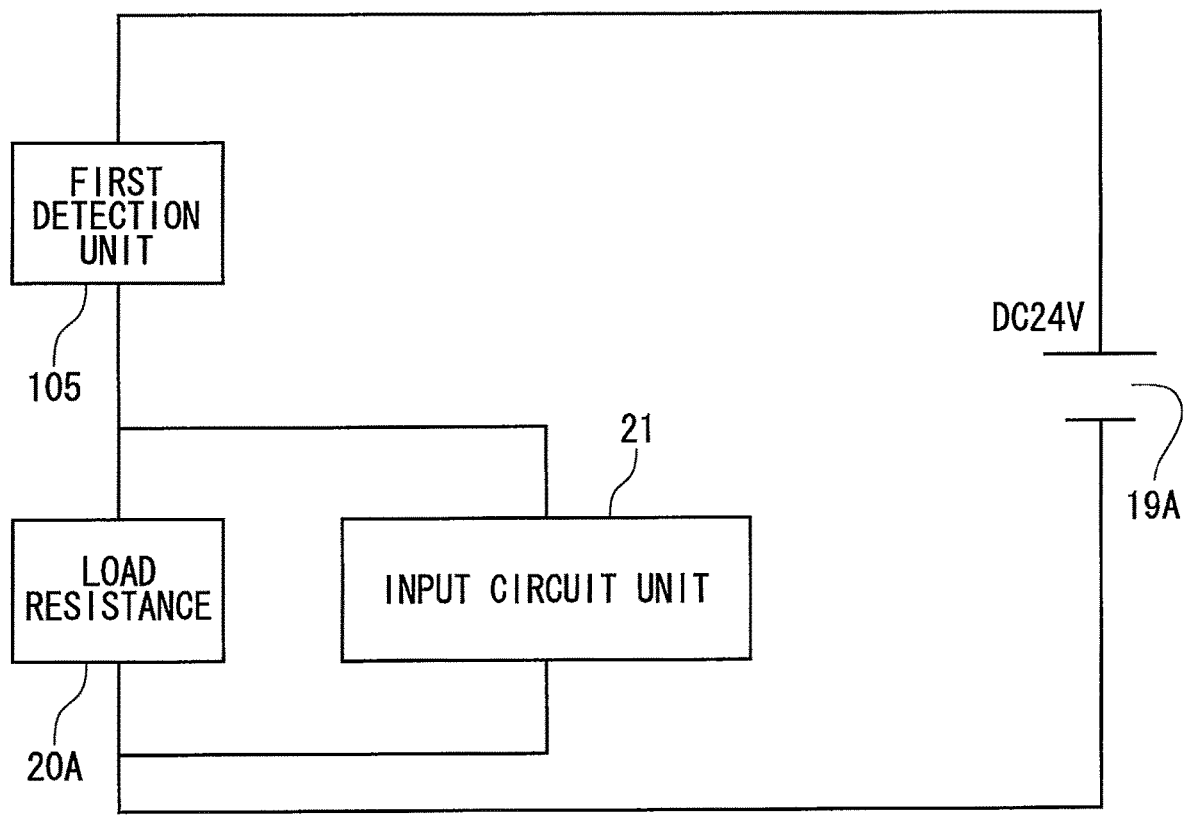
FIG. 6 is a circuit diagram for explaining the relationship between the detection unit and the input circuit unit shown in FIG. 5.

FIG. 6 is a circuit diagram for explaining the relationship among the detection unit, the input circuit unit, a power supply unit, and a load resistance shown in FIG. 5. In the drawings, parts similar to those in embodiments above are denoted by the same reference characters and description thereof is omitted.

The difference between the present embodiment 3 and embodiment 1 above is that the detection unit needs a power supply. As the detection unit that needs a power supply, a transmitter is conceivable, for example. Thus, the signal measuring method by the signal measuring device according to the present embodiment 3 can be performed in a manner similar to that described with reference to FIG. 2 of embodiment 1 above. Thus, the description of the signal measuring method according to the present embodiment 3 is omitted as appropriate.

In the drawings, parts similar to those in embodiment 1 above are denoted by the same reference characters and description thereof is omitted.

A first detection unit 105, a second detection unit 106, a third detection unit 107, and an Nth detection unit 1N are each composed of, for example, a transmitter that needs a power supply.

The first switching terminal portion 10A, of the signal switching unit 10, which performs signal switching for the first detection unit 105 includes a fourth input terminal 17A, a fourth output terminal 18A, a power supply unit 19A, and a load resistance 20A.

The first detection unit 105, the power supply unit 19A, and the load resistance 20A are connected in series.

The load resistance 20A and the input circuit unit 21 are connected in parallel, and are connected via the fourth input terminal 17A and the fourth output terminal 18A.

The switching command unit 22 outputs the switching command signal T to the first switching terminal portion 10A, that is, to the fourth input terminal 17A and the fourth output terminal 18A.

Similarly, the second switching terminal portion 10B, of the signal switching unit 10, which performs signal switching for the second detection unit 106 includes a fourth input terminal 17B, a fourth output terminal 18B, a power supply unit 19B, and a load resistance 20B.

The second detection unit 106, the power supply unit 19B, and the load resistance 20B are connected in series.

The load resistance 20B and the input circuit unit 21 are connected in parallel, and are connected via the fourth input terminal 17B and the fourth output terminal 18B.

The switching command unit 22 outputs the switching command signal T to the second switching terminal portion 10B, that is, the fourth input terminal 17B and the fourth output terminal 18B.

Similarly, the third switching terminal portion 10C, of the signal switching unit 10, which performs signal switching for the third detection unit 107 includes a fourth input terminal 17C, a fourth output terminal 18C, a power supply unit 19C, and a load resistance 20C.

The third detection unit 107, the power supply unit 19C, and the load resistance 20C are connected in series.

The load resistance 20C and the input circuit unit 21 are connected in parallel, and are connected via the fourth input terminal 17C and the fourth output terminal 18C.

The switching command unit 22 outputs the switching command signal T to the third switching terminal portion 10C, that is, the fourth input terminal 17C and the fourth output terminal 18C.

Similarly, an Nth switching terminal portion 10N, of the signal switching unit 10, which performs signal switching for the Nth detection unit 1N includes a fourth input terminal 17N, a fourth output terminal 18N, a power supply unit 19N, and a load resistance 20N.

The Nth detection unit 1N, the power supply unit 19N, and the load resistance 20N are connected in series.

The load resistance 20N and the input circuit unit 21 are connected in parallel, and are connected via the fourth input terminal 17N and the fourth output terminal 18N.

The switching command unit 22 outputs the switching command signal T to the Nth switching terminal portion 10N, that is, the fourth input terminal 17N and the fourth output terminal 18N.

The fourth input terminals 17A, 17B, 17C, 17N, and the fourth output terminals 18A, 18B, 18C, 18N are each composed of a switching mechanism which performs opening/closing.

Next, operation of the signal measuring device 1 according to embodiment 3 configured as above will be described. As shown in the circuit diagram in FIG. 6, the first detection unit 105, the power supply unit 19A, and the load resistance 20A are connected in series. Thus, the first detection unit 105 is always supplied with power from the power supply unit 19A. It should be noted that the fourth input terminal 17A and the fourth output terminal 18A are present in this circuit, but not shown in FIG. 6.

The load resistance 20A and the input circuit unit 21 are connected in parallel, and connected via the fourth input terminal 17A and the fourth output terminal 18A, and switching is performed. Thus, in the present embodiment 3, the stable measurement time after which the process signal inputted from the first detection unit 105 to the input circuit unit 21 is stably measurable is determined in advance on the basis of this circuit.

Switching for the first detection unit 105 is performed in response to the switching command signal T being transmitted to the fourth input terminal 17A and the fourth output terminal 18A. When the signal of the first detection unit 105 is to be measured, the fourth input terminal 17A and the fourth output terminal 18A each enter a closed state, and the process signal of the first detection unit 105 is inputted via the load resistance 20A to the input circuit unit 21. Accordingly, the signal of the first detection unit 105 can be measured as in embodiment 1 above. Since this also applies to the second detection unit 106, the third detection unit 107, and the Nth detection unit 1N, description thereof is omitted.

According to the signal measuring device of embodiment 3 configured as above, it is needless to say that effects similar to those obtained by embodiment 1 above are obtained. In addition, with respect to the detection unit that needs a power supply, the detection unit is always connected to a power supply, and when the signal of the detection unit is to be measured, the signal via the load resistance is measured. Therefore, the process signal of the detection unit can be easily measured as in embodiment 1 above.

In the embodiments described above, examples each employing one kind of detection unit have been shown, for convenience. That is, an example employing a detection unit that uses electromotive force has been described in embodiment 1, an example employing a detection unit that needs a constant current has been described in embodiment 2, and an example employing a detection unit that needs a power supply has been described in embodiment 3. However, not limited thereto, even when two or more kinds of the detection unit are present, if circuits necessary for the respective kinds of the detection unit are provided, the process signal of each detection unit can be measured as in the embodiments described above.

It should be noted that, within the scope of the present invention, the above embodiments may be freely combined with each other, or each of the above embodiments may be modified or omitted as appropriate.

The invention claimed is:

1. A signal measuring device measuring process signals in a signal measurement target section, the signal measurement target section including a plurality of detection units, each detection unit detecting a continuously varying process signal, the signal measuring device comprising:
   one input circuit for receiving the process signal from each detection unit;
   a signal switching unit for performing open/close switching between each detection unit and the input circuit;
   a signal processor connected to the input circuit and for processing the process signal; and
   a switching command circuit for outputting, to the signal switching unit, a switching command signal that corresponds to an open/close time set such that one of the detection units is connected to the input circuit, the switching command circuit for outputting, to the signal processor, a measurement command signal that corresponds to a stable measurement time which is set for each detection unit and after which the process signal inputted from the detection unit to the input circuit is stably measurable;
   wherein the signal measuring device comprises
      a constant current circuit coupled to the signal switching unit and configured to provide a detection unit, of the plurality of detection units, with a constant current via the signal switching unit,
   wherein:
      the signal switching unit includes a second input terminal, a second output terminal, a third input terminal, and a third output terminal, for the detection unit that needs a constant current,
      the detection unit that needs a constant current and the input circuit are connected via the second input terminal and the second output terminal,
      the detection unit that needs a constant current and the constant current circuit are connected via the third input terminal and the third output terminal, and
      the switching command circuit outputs the switching command signal to the second input terminal, the second output terminal, the third input terminal, and the third output terminal.

2. The signal measuring device according to claim 1, wherein
   the signal switching unit has a first input terminal and a first output terminal formed therein, for the detection unit for which the process signal is generated by electromotive force,
   the detection unit for which the process signal is an electromotive force signal and the input circuit are connected via the first input terminal and the first output terminal, and
   the switching command circuit outputs the switching command signal to the first input terminal and the first output terminal.

3. The signal measuring device according to claim 1, further comprising a power supply unit coupled to the signal switching unit and configured to provide a detection unit, of the plurality of detection units, a power supply via the signal switching unit, wherein
   the signal switching unit includes a fourth input terminal, a fourth output terminal, the power supply unit, and a load resistance, for the detection unit that needs a power supply, the detection unit that needs a power supply, the power supply unit, and the load resistance are connected in series, the load resistance and the input circuit are connected in parallel, and are connected via the fourth input terminal and the fourth output terminal, and the switching command circuit outputs the switching command signal to the fourth input terminal and the fourth output terminal.

4. The signal measuring device according to claim 3, wherein:

the signal switching unit has a first input terminal and a first output terminal formed therein, for the detection unit for which the process signal is generated by electromotive force, the detection unit for which the process signal is an electromotive force signal and the input circuit are connected via the first input terminal and the first output terminal, and the switching command circuit outputs the switching command signal to the first input terminal and the first output terminal.

5. A signal measuring device measuring process signals in a signal measurement target section, the signal measurement target section including a plurality of detection units, each detection unit detecting a continuously varying process signal, the signal measuring device comprising:

one input circuit for receiving the process signal from each detection unit;

a signal switching unit for performing open/close switching between each detection unit and the input circuit;

a signal processor connected to the input circuit and for processing the process signal; and a switching command circuit for outputting, to the signal switching unit, a switching command signal that corresponds to an open/close time set such that one of the detection units is connected to the input circuit, the switching command circuit for outputting, to the signal processor, a measurement command signal that corresponds to a stable measurement time which is set for each detection unit and after which the process signal inputted from the detection unit to the input circuit is stably measurable;

wherein the signal measuring device comprises a power supply unit coupled to the signal switching unit and configured to provide a detection unit, of the plurality of detection units, a power supply via the signal switching unit, wherein:

the signal switching unit includes a fourth input terminal, a fourth output terminal, the power supply unit, and a load resistance, for the detection unit that needs a power supply, the detection unit that needs a power supply, the power supply unit, and the load resistance are connected in series, the load resistance and the input circuit are connected in parallel, and are connected via the fourth input terminal and the fourth output terminal, and the switching command circuit outputs the switching command signal to the fourth input terminal and the fourth output terminal.

6. The signal measuring device according to claim 5, wherein:

the signal switching unit has a first input terminal and a first output terminal formed therein, for the detection unit for which the process signal is generated by electromotive force, the detection unit for which the process signal is an electromotive force signal and the input circuit are connected via the first input terminal and the first output terminal, and the switching command circuit outputs the switching command signal to the first input terminal and the first output terminal.

\* \* \* \* \*